Oct. 6, 1964    M. A. ORLOFF    3,152,029
MANUFACTURE OF PLYWOOD
Filed Aug. 31, 1961
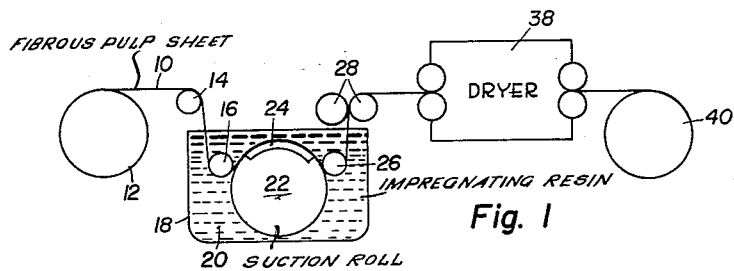
Fig. 1
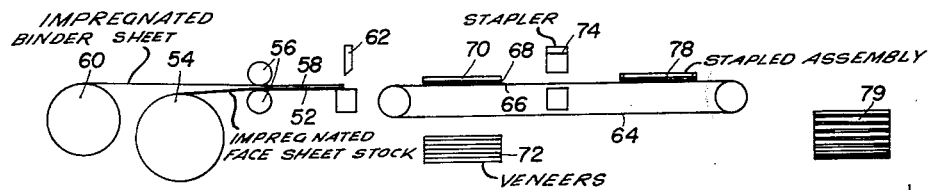
Fig. 2
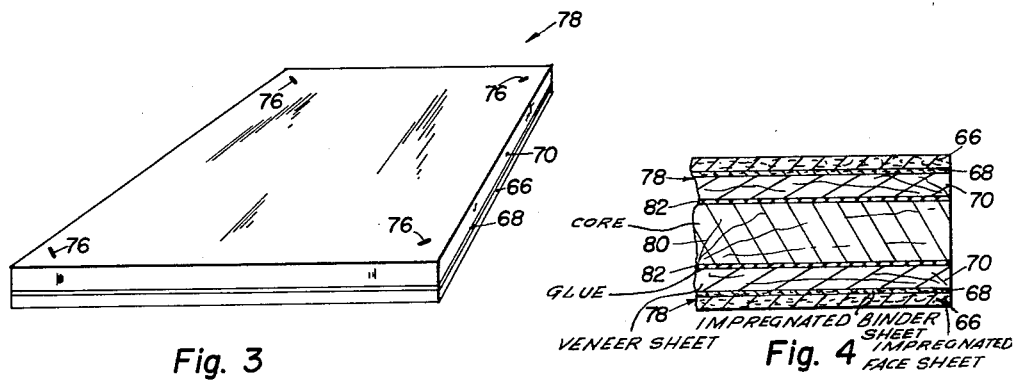
Fig. 3
Fig. 4
INVENTOR.
MONFORD A. ORLOFF
BY
BUCKHORN, CHEATHAM & BLORE
ATTORNEYS United States Patent Office 3,152,029
Patented Oct. 6, 1964

3,152,029
MANUFACTURE OF PLYWOOD
Monford A. Orloff, Aberdeen, Wash., assignor, by mesne assignments, to Evans Products Company, Portland, Oreg., a corporation of Delaware
Filed Aug. 31, 1961, Ser. No. 135,164
3 Claims. (Cl. 156—91)

The present invention relates to the manufacture of plywood and more particularly to the manufacture of plywood having a resin impregnated fibrous overlay on the faces thereof.

For the purpose of masking defects on the face veneers of plywood, and also to provide a smoother more wear-resisting surface, a resin impregnated fibrous sheet is frequently secured to the exposed wood faces of plywood panels. For many purposes a plywood panel having a so-called medium density overlay, that is, a fibrous sheet such as a kraft paper impregnated with between about 20 to 40 percent of a resin such as a phenolic-aldehyde resin, is desirable. Such impregnated pulp sheets are not self adhering to the face veneer of the plywood and it is necessary to provide a glue line adhesive to effect bonding of the overlay sheet to the face veneer.

Heretofore, it has been the practice to provide such an adhesive by preferably coating the adhesive upon the surface of the overlay sheet which is to be united with the face of the veneer, generally by rolling the glue line adhesive upon the surface of the impregnated sheet. Such a procedure is disadvantageous in that it is difficult when applying adhesive with rolls to the relatively thin overlay sheets to secure an even application of the adhesive which leads to further difficulties in that lack of sufficient adhesive might cause failure of the bond, and if more than sufficient adhesive is present at certain places on the panel blistering may occur or migration of the excess resin through the overlay may give the finished panel an undesirable mottled appearance. The variance in resin density may also cause a variance in the reception of the paint over the panel so that upon painting the panel will not have an even textured appearance.

It is, therefore, an object of the present invention to provide a new and improved process for the manufacture of plywood having resin impregnated overlay on the faces thereof.

More particularly, it is an object of the present invention to provide a new and improved method for securing medium density resin impregnated overlays to the surface of plywood assemblies.

A further object of the present invention is to provide a method for manufacturing overlayed plywood which will result in savings in cost.

Still another object of the invention is to provide a method which will enable the manufacture of overlayed plywood of uniform high quality and with a minimum of falldowns in production.

Other objects and advantages of the present invention will become more apparent hereinafter.

In accordance with the method of the present invention, for the overlay or face sheet there is provided a relatively thick or heavy fibrous sheet such as a ground wood pulp sheet or a kraft paper impregnated with a phenolic-aldehyde type resin so as to provide a resin content of between 20 to 40 percent of dry resin solids based on the dry weight of the impregnated paper. A second fibrous sheet of relatively light weight is also provided and which is impregnated with a phenolic-aldehyde type resin so as to provide a dry resin solids content of at least about 65 percent based upon the dry weight of the impregnated sheet. The dry resin impregnated sheets are assembled upon a face veneer with the second sheet mentioned above interposed between the face sheet and the veneer. This assembly is stapled at the four corners thereof so as to retain it together and it may be then stacked and stored for future use.

When a plywood panel is to be fabricated, two of such assemblies as described above are positioned on the opposite sides of a core unit which may comprise a single sheet or odd numbers of core sheets having a suitable glue line adhesive between them and there also being a coating of glue line adhesive on each of the opposite sides of the core unit. Finally, the entire assembly is subjected to heat and pressure in a suitable press to effect curing of the resins in the face sheets and curing of the glue line adhesives which results in the bonding of the wood veneers and core sheets, one to the other, and of the fibrous sheets to the veneer.

For a more detailed description of the invention reference is made to the following specification and to the accompanying drawings, wherein:

FIG. 1 is a schematic view showing a method of impregnating fibrous sheet in accordance with the invention;

FIG. 2 is a schematic view showing a method of preparing overlay assemblies in accordance with the invention;

FIG. 3 is an enlarged view showing a completed overlay assembly; and

FIG. 4 is an enlarged, fragmentary, cross sectional view showing a completed plywood panel made in accordance with the invention.

The first step in the process of the present invention is the preparation of the impregnated fibrous sheets and which may be done in accordance with the procedure illustrated in FIGURE 1. As shown therein, a dry continuous sheet of fibrous pulp 10 is pulled from a roll 12 over a guide roll 14 and then downwardly and beneath a further guide roll 16 immersed in a tank 18 containing an aqueous dispersion or solution 20 of the impregnating resin. From the roll 16 the sheet is led over a rotatable foraminous suction roll 22 immersed in the resin solution 20. The suction roll 22 is provided with a stationary suction head 24 to define a localized suction area on the periphery of the roll. From the suction roll 22 the sheet is led under a further guide roll 26 and then upwardly between a pair of squeeze rolls 28 disposed above the tank.

The suction head 24 is adapted to draw the impregnating solution 20 through the entire thickness of the sheet 10 so that the sheet will be thoroughly impregnated with the resin solution. Any excess solution is squeezed out of the sheet by the rolls 28. After passage of the web through the nip of the squeeze rolls it is fed into a dryer 38 and then is wound upon a rewind roll 40. The temperature and period within the dryer 38 should be such that no substantial amount of curing of the resin occurs and the resin will flow upon subsequent pressing as an overlay upon a plywood panel.

FIGURE 1 should be understood to be merely representative of the procedure which may be utilized in impregnating the pulp or fiber sheets used in the process of the present invention and other arrangements and procedures may be utilized in impregnating the sheets used herein.

The resin solution and the conditions of treatment of the sheet to dry the same will, of course, vary depending upon the resin solution utilized.

If desired the resin may be introduced into the sheet during the formation of the same as, for example, by the process described in the patent to G. D. King, U.S. No. 2,804,418.

As indicated above in accordance with the invention two fibrous sheets of different weights are utilized. The outermost or face sheet is preferably a relatively heavy paper capable of effectively masking the defects and wood grains of a wood veneer. The face sheet may comprise a kraft or sulphite pulp type paper or one prepared from a mixture of such pulps having a basis weight of between about 30 to 100 pounds per 1000 square feet. A basis weight paper of between about 50 to 65 pounds is preferred.

The impregnating resin for the face sheet may be a phenol-formaldehyde type resin such as, for example, of the type described in the patent to G. D. King, U.S. No. 2,804,418. The preferred resin is a cresylic acid-formaldehyde partial condensation product prepared as described in the James V. Nevin Patent No. 2,150,698. This latter resin has the advantage of not adhering to the caul plates of a plywood press even when not pre-cured and also is relatively lower in cost than resins using phenol per se or other phenolic compounds. A suitable overlay sheet prepared with this resin comprises a loosely matted kraft pulp sheet having a basis weight of between about 53 to 55 pounds per thousand square feet impregnated with about twenty-nine percent resin solids on a dry weight basis.

The amount of resin impregnation of the face sheet may vary between 20 to 40 percent based on the ratio of the weight of dry resin solids to the weight of the dry, impregnated paper. Preferably, the sheet should have a moisture content of between about 4 to 7 percent.

Since the fibrous sheet of the bonding layer serves only as a carrier for the resin impregnated therein and is not required to provide any masking ability a relatively light weight sheet may be utilized. A kraft or sulphite pulp sheet having a basis weight of between about 5 to 8 pounds per 1000 square feet is satisfactory.

This sheet, preferably, is impregnated with at least about 65 percent of a phenol-formaldehyde type resin based on dry weight of resin solids and dry weight of impregnated paper. The impregnating resin, preferably, is one that flows freely upon heating to curing temperatures to form a bond between the face sheet and the veneer. A suitable impregnated paper for this purpose is a paper having a weight of about 15 pounds per thousand square feet of impregnated paper. The impregnating resin is a phenol-formaldehyde type cured to the B-stage. The resin content of the sheet is about 67 percent resin solids on a dry weight basis. The moisture content of the bonding sheet preferably is about 8 or 9 percent.

Turning now to FIG. 2, in accordance with the process of the invention a continuous sheet 52 of the resin impregnated face-sheet stock is drawn from a supply roll 54 by a pair of draw rolls 56 which simultaneously draw a continuous binder sheet 58 from a supply roll 60 thereof with the sheet 58 superposed upon the sheet 52. The sheets are fed past a cut off knife 62 which is intermittently operated by suitable means to cut off desired lengths of the sheets 58, 52 as they are fed onto a conveyor 64. The cut off lengths of the sheets 52, 58 are designated at 66, 68, respectively. After the sheets 66, 68 have been severed a sheet of the face veneer 70 is fed by any suitable means from a supply stack 72 onto the sheet 68 and the assembly then carried on the conveyor past means to secure them together comprising a stapling mechanism indicated at 74 which is operated by suitable means to staple the veneer and sheets together at the four corners thereof, as indicated at 76 in FIG. 3, so that the elements will maintain their position during subsequent handling of the assembly. The sheets 66, 68 and veneer 70 are oversize and the staples 76 are positioned in the portions to be trimmed from the completed panel. From the stapler 74 the stapled assembly 78, shown in enlarged scale in FIG. 3, is carried along the conveyor and stacked as indicated at 79 for transfer to the plywood assembly operation.

Preferably the veneer 70 should have a moisture content of about 4 to 5 percent and the face assembly 78 is preferably utilized as soon after layup as is conveniently possible so that undue amounts of moisture are not absorbed from the atmosphere by the veneer and impregnated sheets. In dry climates or in humidity controlled plants undue amounts of moisture may not be absorbed even with several days' or weeks' storage, but under humid conditions, it is preferred to use the assemblies within several hours. Absorption of excessive moisture may cause steam pockets to form in the panel during pressing, creating "blows" or defects in the panel when the pressure of the pressing operation is relieved.

In the formation of plywood one of the units 78 is layed upon a table with the veneer 70 facing upwardly and a core unit 80 is positioned thereon. The core unit 80 may consist of a single core sheet or a plurality of core sheets having a suitable glue line adhesive 82 between the sheets and upon each of the opposite surfaces thereof. Suitable resins for this purpose include phenol-aldehyde types. On top of the core unit 80 a second face unit 78 is positioned with the veneer sheet 70 thereof adjacent the upwardly facing glue line 82 of the core unit. A number of such assemblies are then placed in a suitable press and heat and pressure applied to effect curing of the impregnating resins and the glue line adhesives. In general, pressures between 175 and 200 pounds per square inch and temperatures of between 270 and 300° F. are utilized. The temperature will vary depending upon the thickness of the plywood assemblies and the amount of moisture which is present therein, the temperature increasing as the amount of moisture and the thickness of the assembly increases. After a suitable period of time the assemblies are removed from the press and cooled and trimmed to standard size which will remove the staples 76 which are in the trimmed portions. The finished product is provided with a smooth glossy surface which masks the irregularities and imperfections in the surface of the plywood face veneer and which will receive paint.

The preparation of the face unit assemblies 78 as described has numerous advantages. First of all, the use of the resin impregnated sheet 68 for providing adhesion of the face sheet 66 to the veneer 70 provides a bond in the finished product that is uniform over the entire surface thus minimizing the chance of failure of bond because of a lack of sufficient adhesive at any area between the face sheet and the veneer. Such failures frequently occur in the use of spread glue surfaces.

A further factor is that the semi-automatic assembly of the units reduces the amount of handling otherwise necessary in the assembly of the plywood and the damage attendant to such handling and thus reduces cost. Another important advantage is that many of the desirable resin impregnates for the adhesion sheet are quite hydroscopic and become tacky when moisture is absorbed. Consequently, the sheet must be protected from the atmosphere in its rolled form to prevent absorption of moisture from the air. Such absorption, which occurs if the rolls are exposed even for several hours, causes the roll layers to laminate together, effectively destroying it. Thus, it is desirable when the use of a roll is commenced to use it entirely within a relatively short period of time and this may be difficult if the roll is cut into sheets of a desired length and is used directly in finished plywood layups, since any slow down in the plant or bottleneck arising may prevent sufficiently rapid use of the roll. However, in making preliminary layups such as described the bonding sheets 68 will be immediately positioned between the face sheets 66 and the veneer 70 and any adherence that does occur will not be of any disadvantage whatsoever. As mentioned before, it has also been found that with the use of the resin impregnated adhesion sheet no migration of the adhering resin appears to occur and, as a result, the face sheet is of uniform appearance and texture and receives an application of paint more uniformly than when spread adhesives are used on the surface of the face sheet.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:
1. The method of manufacturing plywood comprising the steps of
   (a) providing a roll and drawing therefrom and continuously feeding along a horizontal path a continuous length of a first dry, fibrous sheet having a basis weight of between about 30 to 100 pounds per 1000 square feet impregnated on a dry weight basis with from about 20 to 40 percent of a phenolic-aldehyde resin, said resin being uncured,
   (b) providing a roll of and drawing therefrom and continuously feeding into superposed relation with said first sheet a continuous length of a second dry, fibrous sheet having a basis weight of between about 5 to 8 pounds per 1000 square feet impregnated on a dry weight basis with at least about 65 percent of a phenolic-aldehyde resin, said resin being uncured,
   (c) severing said superposed sheets at predetermined intervals to provide registering pairs of sheets,
   (d) positioning a wood veneer upon each of said pairs of sheets in register therewith, said veneer having no adhesive thereon,
   (e) stapling said veneer and the sheets positioned together at the four corners thereof to provide a face unit in which said second sheet is interleaved in protected relation between said first sheet and said wood veneer,
   (f) assembling a pair of said face units with a core unit to provide a layup for a plywood panel,
   (g) positioning said layup in a press and applying heat and pressure to cure said resins and effect adhesion of said sheets to said veneers.

2. The method of manufacturing plywood comprising the steps of
   (a) providing a roll of and drawing therefrom and continuously feeding along a horizontal path a continuous length of a first dry, fibrous sheet having a basis weight of between about 30 to 100 pounds per 1000 square feet impregnated on a dry weight basis with from about 20 to 40 percent of a cresylic-aldehyde resin, said resin being uncured,
   (b) providing a roll of and drawing therefrom and continuously feeding into superposed relation with said first sheet a continuous length of a second dry, fibrous sheet having a basis weight of between about 5 to 8 pounds per 1000 square feet impregnated on a dry weight basis with about 67 percent of a phenolic-aldehyde resin,
   (c) severing said superposed sheets at predetermined intervals to provide registering pairs of sheets,
   (d) positioning a wood veneer upon each of said pairs of sheets in register therewith, said veneer having no adhesive thereon,
   (e) stapling said veneer and the sheets positioned therebeneath together to provide a face unit in which said second sheet is interleaved in protected relation between said first sheet and said wood veneer,
   (f) assembling a pair of said face units with a core unit to provide a layup for a plywood panel,
   (g) positioning said layup in a press and applying heat and pressure to cure said resins and effect adhesion of said sheets to said veneers.

3. The method of manufacturing plywood comprising
   (a) providing a roll of and drawing therefrom and continuously feeding along a horizontal path a first continuous fibrous sheet having a basis weight of between about 30 to 100 pounds per 1000 square feet impregnated with between about 20 to 40 percent phenolic-aldehyde thermosetting resin based on weight of dry resin solids and dry, impregnated pulp sheet, said impregnated sheet having a moisture content of about 4 to 7 percent,
   (b) providing a roll of and drawing therefrom and continuously feeding into superposed relation with said first sheet a second continuous, fibrous sheet having a basis weight of between about 5 to 8 pounds per 1000 square feet, said second sheet being impregnated with at least about 65 percent of a phenolic-aldehyde thermosetting resin based on weight of dry resin solids and dry, impregnated pulp sheet, said resins being uncured, said second impregnated sheet having a moisture content of between about 8 to 9 percent,
   (c) cutting said superposed sheets into predetermined lengths to form pairs thereof,
   (d) positioning a wood veneer having a moisture content of between about 4 to 5 percent upon each of said pairs of superposed sheet lengths,
   (e) stapling together said superposed sheet lengths and the veneer positioned thereon at the corners thereof to form a face unit in which said second sheet is interleaved in protected relation between said first sheet and said wood veneer,
   (f) positioning a pair of such units one on each of the opposite sides of a plywood core unit, providing glue line adhesive to unite said core unit and said veneers to the opposite sides thereof,
   (g) subjecting the entire assembly to heat and pressure to effect joining of said veneers to said core unit and said fibrous sheets to said veneers,
   (h) and trimming the panels so formed to remove the staples therefrom.

References Cited in the file of this patent
UNITED STATES PATENTS

| | | |
|---|---|---|
| 2,133,108 | Muller | Oct. 11, 1938 |
| 2,343,740 | Birmingham | Mar. 7, 1944 |
| 2,456,006 | Hickler | Dec. 14, 1948 |
| 2,459,851 | Story | Jan. 25, 1949 |
| 2,699,416 | Lyijynen et al. | Jan. 11, 1955 |